(12) United States Patent
Cho et al.

(10) Patent No.: US 8,385,406 B2
(45) Date of Patent: Feb. 26, 2013

(54) METHOD AND APPARATUS OF CODING/DECODING IMAGE

(75) Inventors: Dae Sung Cho, Seoul (KR); Woong Il Cho, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1176 days.

(21) Appl. No.: 12/285,425

(22) Filed: Oct. 3, 2008

(65) Prior Publication Data

US 2009/0232198 A1    Sep. 17, 2009

(30) Foreign Application Priority Data

Mar. 12, 2008    (KR) .................. 10-2008-0022964

(51) Int. Cl.
*H04N 21/234* (2006.01)

(52) U.S. Cl. ........... 375/240.01; 375/E7.03; 375/E7.211

(58) Field of Classification Search .................. None
See application file for complete search history.

(56) References Cited

U.S. PATENT DOCUMENTS

2005/0169549 A1* 8/2005 Cha et al. ...................... 382/240
2007/0071104 A1* 3/2007 Kondo .................... 375/240.21

* cited by examiner

*Primary Examiner* — Gilberto Barron, Jr.
*Assistant Examiner* — Izunna Okeke
(74) *Attorney, Agent, or Firm* — Staas & Halsey LLP

(57) ABSTRACT

An apparatus and a method of coding/decoding an image are provided. The apparatus includes: a low resolution image coding unit that codes a low resolution image corresponding to an input image using motion estimation and compensation; and a residual image coding unit that performs intra mode coding with respect to a residual image which indicates a difference between a reconstructed image of the coded low resolution image and the input image by considering temporal correlation between neighboring residual images.

15 Claims, 10 Drawing Sheets

METHOD AND APPARATUS OF CODING/DECODING IMAGE

CROSS-REFERENCE TO RELATED APPLICATIONS

This application claims the benefit of Korean Patent Application No. 10-2008-0022964, filed on Mar. 12, 2008, in the Korean Intellectual Property Office, the disclosure of which is incorporated herein by reference.

BACKGROUND

1. Field

The following description relates to image processing, and more particularly, to an apparatus and a method of coding power distribution using a residual image and an apparatus and a method of decoding power distribution.

2. Description of the Related Art

With the development of multimedia-related technologies, image compression techniques and image transmission techniques are being rapidly developed. Furthermore, popularization of portable multimedia devices such as digital cameras and portable terminals have greatly increased. In multimedia devices, it is required to code image data to a lower capacity of data information in order to more quickly and smoothly transmit the image data.

To satisfy the above-mentioned needs, image compression techniques such as a Motion Picture Expert Group 1 (MPEG 1) scheme, an MPEG 2 scheme, an MPEG 4 scheme, an H.264 scheme, and the like have been provided, and image communication via portable multimedia devices has been popularized through the image compression techniques.

Generally, a technique that can extend the time of usable power by compressing an image with low power is required since portable multimedia devices have limited battery capacity.

SUMMARY

Accordingly, it is an aspect of the present invention to provide an apparatus and a method of coding/decoding an image that can obtain a reconstructed image through side information reconstruction and syndrome decoding in a decoding terminal through motion estimation without performing the motion estimation and compensation in a coding terminal.

It is another aspect of the present invention to provide an apparatus and a method of coding/decoding an image that can compensate for quality deterioration by using motion estimation and also compensate by using temporal correlation between images in a decoding terminal, the quality deterioration occurring since motion estimation and compensation are not performed in a coding terminal.

Additional aspects and/or advantages will be set forth in part in the description which follows and, in part, will be apparent from the description, or may be learned by practice of the invention.

The foregoing and/or other aspects are achieved by providing an apparatus to code an image including: a low resolution image coding unit that codes a plurality of low resolution images respectively corresponding to a plurality of input images using motion estimation and compensation; and a residual image coding unit that performs intra mode coding with respect to plurality of residual images, the residual images relating to differences between reconstructed images of the coded low resolution images and the input images, the residual image coding unit performing the intra mode coding by considering a temporal correlation between neighboring residual images.

The foregoing and/or other aspects are achieved by providing a method of coding a residual image including: quantizing the residual image to generate a plurality of quantizing coefficients; classifying the plurality of quantizing coefficients into a co-set including at least two of the quantizing coefficients; and coding the residual image, the input image including operations which code the co-set to a single symbol.

The foregoing and/or other aspects are achieved by providing an apparatus to decode an image including: a low resolution image decoding unit that decodes a first bitstream corresponding to a low resolution image; and a residual image decoding unit that decodes a second bitstream corresponding to one of plurality of a residual images using a temporal correlation between neighboring ones of the residual images.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
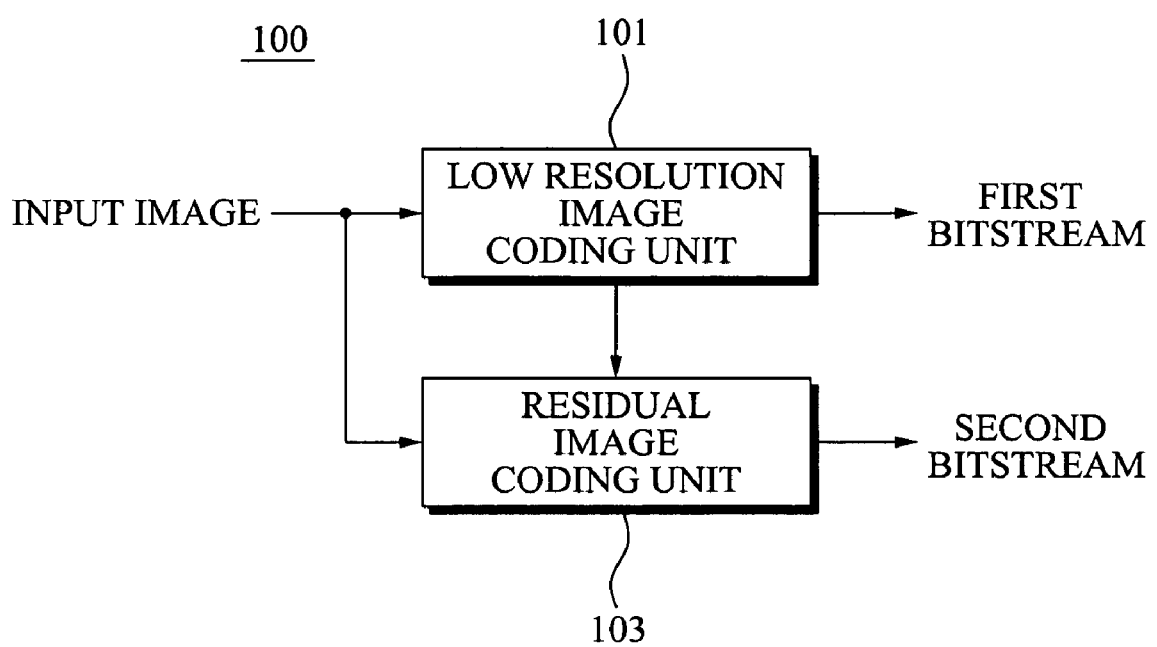
FIG. 1 is a block-diagram illustrating a configuration of an apparatus for coding an image according to an exemplary embodiment of the present invention.

Reference will now be made in detail to the embodiments, examples of which are illustrated in the accompanying drawings, wherein like reference numerals refer to the like elements throughout unless otherwise specified. The embodiments are described below to explain the present invention by referring to the figures.

FIG. 1 is a block-diagram illustrating a configuration of an apparatus 100 to code an image according to an exemplary embodiment of the present invention.

Referring to FIG. 1, the apparatus 100 to code the image includes a low resolution image coding unit 101 and a residual image coding unit 103.

The low resolution image coding unit 101 down-samples a resolution of an input image ($n^{th}$ frame, n=a natural number) to a predetermined resolution to generate a low resolution image. Also, the low resolution image coding unit 101 codes the low resolution image according to a predetermined coding scheme to generate a first bitstream.

According to the present exemplary embodiment, the low resolution image coding unit 101 may down-sample an input image to a low resolution image with each of a vertical resolution ratio and horizontal resolution ratio that is 1/2 of the input image (i.e. resolution ratio of the entire space is 1/4). Also, the low resolution image coding unit 101 may perform motion compensation-discrete cosine transform (MC-DCT) coding with respect to a low resolution image.

Also, the low resolution image coding unit 101 may reconstruct the coded low resolution image to provide the reconstructed low resolution image to the residual image coding unit 103.

Complexity of calculation required for motion estimation may be decreased since the apparatus 100 to code the image codes a low resolution image.

With respect to a low resolution image, quality deterioration may occur when the low resolution image is reconstructed to an original resolution after decoding in a decoding terminal. The residual image coding unit 103 codes a residual image indicating a difference between an input image and a low resolution image to generate a second bitstream in order to compensate for the quality deterioration occurring when reconstructing a reconstructed image to an original resolution.

The residual image coding unit 103 up-samples the reconstructed low resolution image provided from the low resolution image coding unit 101 to generate a residual image indicating a difference between the up-sampled image and the input image.

According to the present exemplary embodiment, the residual image coding unit 103 may perform intra mode coding with respect to the residual image indicating the difference between the up-sampled image and the input image, or may perform power distribution coding with respect to the residual image using a temporal correlation model between neighboring residual images.

In this instance, the power distribution coding denotes that motion estimation and compensation, that is a complex operation occupying most of computing, moves from an encoder to a decoder so that power use is distributed to both the encoder and decoder. As an example of the power distribution coding scheme, a Wyner-Ziv scheme may be used.

Figure 2:
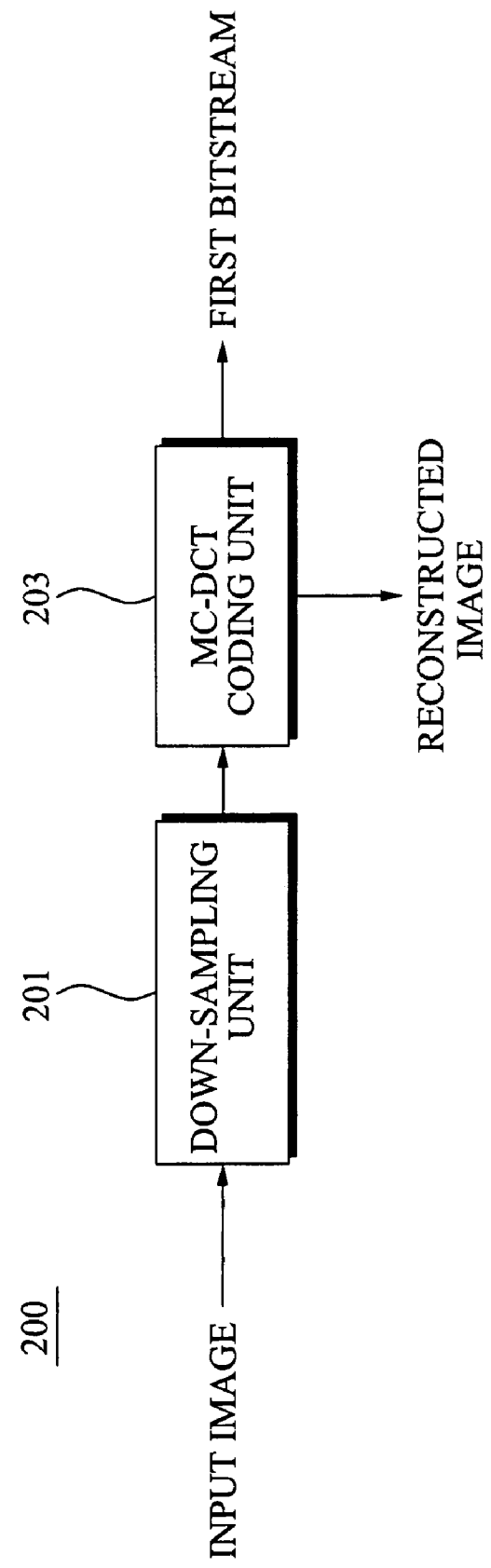
FIG. 2 is a block-diagram illustrating a configuration of a low resolution image coding unit according to an exemplary embodiment of the present invention.

FIG. 2 is a block-diagram illustrating a configuration of a low resolution image coding unit 200 according to an exemplary embodiment of the present invention. The low resolution image coding unit 200 may be used as the low resolution image coding unit 101.

Referring to FIG. 2, the low resolution image coding unit 200 includes a down-sampling unit 201 and an MC-DCT coding unit 203.

The down-sampling unit 201 down-samples a resolution of an input image to a predetermined resolution to generate a low resolution image. According to the exemplary embodiment, a ratio of the input image to the low resolution image may be 1/4.

The MC-DCT coding unit 203 performs MC-DCT coding with respect to the low resolution image so that the MC-DCT coding unit 203 generates an estimated image through motion estimation and compensation between low resolution images, and codes the input image by performing discrete cosine transform (DCT, quantization, and entropy coding) with respect to a difference between the estimated image and the input image. That is, the MC-DCT coding unit 203 may code the input image according to international standards of Motion Picture Expert Group 1 (MPEG 1), MPEG 2, MPEG 4, and H.264.

Also, the MC-DCT coding unit 203 may reconstruct the MC-DCT coded low resolution image to provide the reconstructed image to the residual image coding unit (103 of FIG. 1).

Figure 3:
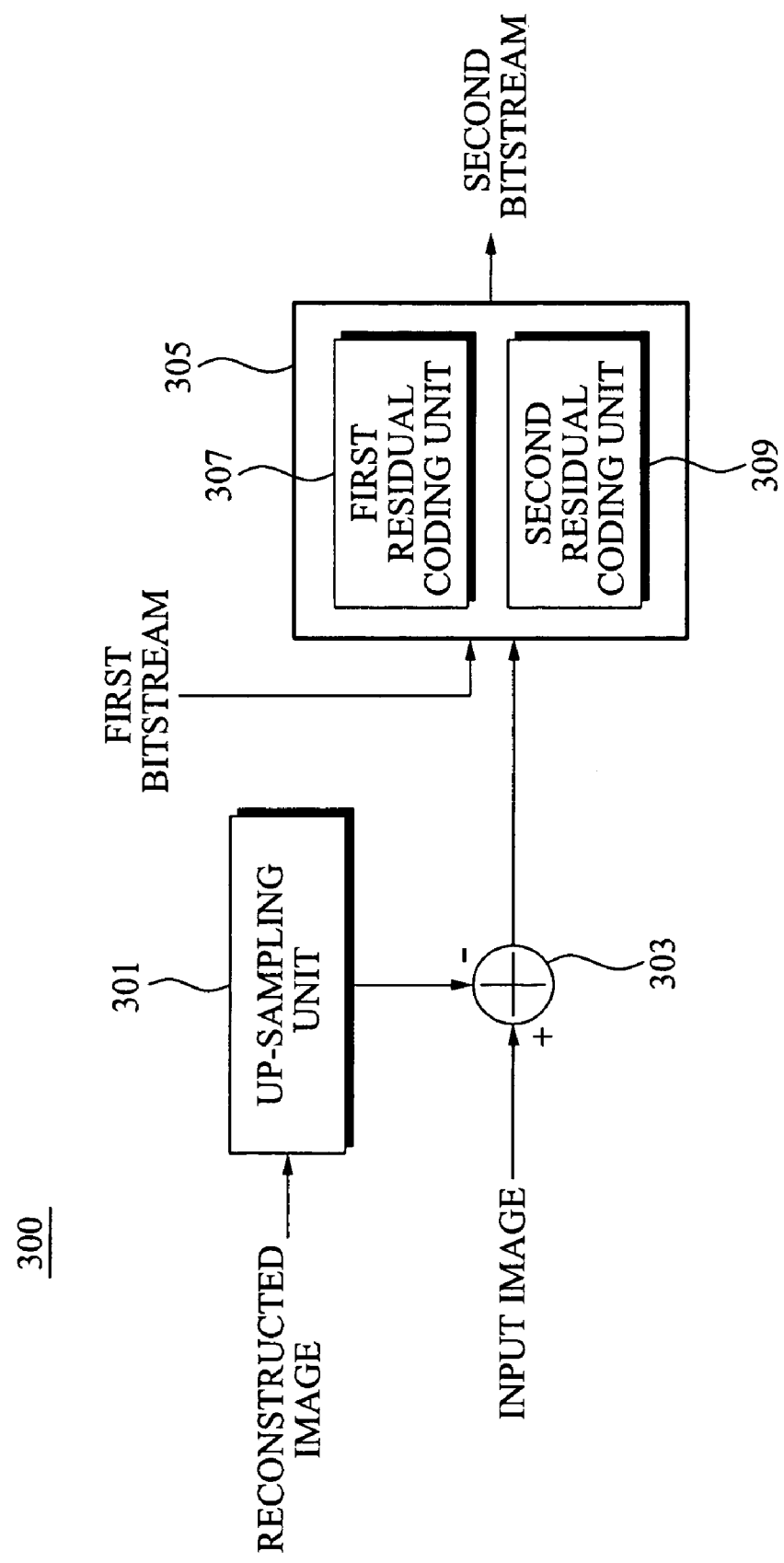
FIG. 3 is a block-diagram illustrating a configuration of a residual image coding unit according to an exemplary embodiment of the present invention.

FIG. 3 is a block-diagram illustrating a configuration of a residual image coding unit 300 according to an exemplary embodiment of the present invention. The residual image coding unit 300 may be used as the residual image coding unit 103.

Referring to FIG. 3, the residual image coding unit 300 includes an up-sampling unit 301, a residual image generation unit 303, and a residual coding unit 305.

The up-sampling unit 301 up-samples the reconstructed image provided from the low resolution image coding unit 200 to an original resolution. As an example, when a resolution ratio of the input image to the low resolution image is 1/4, the up-sampling unit 301 up-samples the reconstructed image respectively in a horizontal direction and a vertical direction twice.

The residual image generation unit 303 generates a residual image indicating a difference between the input image and the up-sampled image. In this instance, the residual image generation unit 303 generates the residual image based on the difference between the input image and the up-sampled image.

The residual coding unit 305 includes a first residual coding unit 307 performing intra mode coding and a second residual coding unit 309 performing coding using temporal correlation instead of motion estimation and compensation between images.

According to the present exemplary embodiment, the intra mode coding using the temporal correlation between the images corresponds to power distribution coding. Wyner-Ziv coding is an example of the power distribution coding.

According to the present exemplary embodiment, the residual coding unit 305 may skip the coding of the residual image when there is no overhead between a first bitstream and the residual image. However, generally, there is overhead between the first bitstream and the residual image since the first bitstream is generated by coding the low resolution image.

The first residual coding unit 307 performs intra mode coding with respect to the residual image when the input image is a key frame. In this instance, the key frame may be an I frame, that is a $(2n-1)^{th}$ frame.

The second residual coding unit 309 performs power distribution coding with respect to the residual image when the input image is not the key frame, for example every even $number^{th}$ frame. Hereinafter, power distribution coded input images refer to power distribution frames in correspondence to the key frame in the specification of the exemplary embodiment.

The second residual coding unit 309 performs power distribution coding with respect to a residual image of a power distribution frame by considering temporal correlation between a first key frame and a second key frame with respect to the residual image of the power distribution frame between the first key frame and the second key frame.

Also, the second residual coding unit 309 groups a predetermined number of a quantizing coefficient into a single co-set to perform syndrome coding with respect to the co-set.

The power distribution coding generates side information about a present frame using correlation between the present frame and a neighboring frame, and the present frame is reconstructed based on a fact that the estimated side information has high correlation with an original frame.

The power distribution coding quantizes the present frame without motion estimation or compensation with respect to the present frame, and exclusively transmits parity information about the input image to a decoding terminal.

With the power distribution coding, a structure of a coding terminal may be simplified and power consumption may be reduced since motion estimation or compensation are not required.

Figure 4:
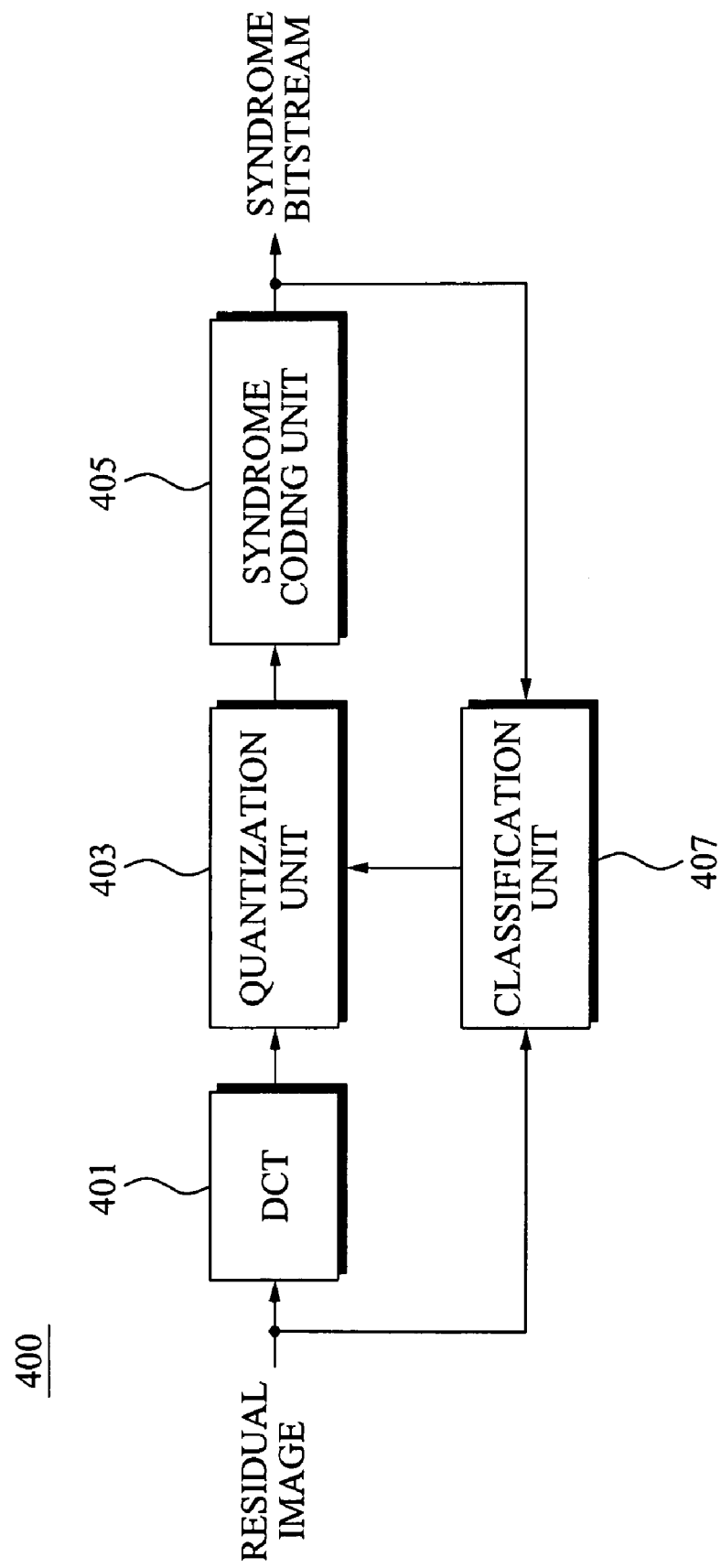
FIG. 4 is a block-diagram illustrating a configuration of another residual coding unit according to an exemplary embodiment of the present invention.

FIG. 4 is a block-diagram illustrating a configuration of another residual image coding unit 400 according to an exemplary embodiment of the present invention. The residual coding unit 400 may alternatively be used as the residual image coding unit 103.

Referring to FIG. 4, the residual image coding unit 400 includes a discrete cosine transform (DCT) unit 401, a quantization unit 403, and a syndrome coding unit 405. According to the present exemplary embodiment, the residual coding unit 400 may further include a classification unit 407.

The DCT unit 401 performs DCT with respect to an inputted residual image by a block unit. In this instance, the inputted residual image may correspond to a power distribution frame when the key frame is repeated in each odd number of $(2n-1)^{th}$.

The quantization unit 403 quantizes the DCT transformed residual image according to a predetermined quantizing method. In this instance, a size of a step of the predetermined quantizing is not limited to a specific size. The residual coding unit 400 performs power distribution coding with respect to the inputted residual image without motion estimation and compensation from a previous residual image.

The syndrome coding unit 405 performs syndrome coding with respect to the predetermined number of a quantizing coefficient to a single symbol to generate a syndrome bitstream. Efficiency of coding is increased since the syndrome coding unit 405 quantizes a plurality of quantizing coefficients to a single symbol.

The power distribution coding and syndrome coding theory applied to the residual coding unit 400 is as follows.

It is assumed that X and Y are symbols having high correlation with each other, and 3-bits of binary data. That is, Y=X+N is satisfied, and N is an error added to X.

When a hamming distance between X and Y is equal to or less than 1 since correlation is high between X and Y, a value of Y is given, such as Y=[0 1 0], a value of X is equal to the value of Y or is different from the value of Y by one-bit. That is, the value of X, codewords, shall be any one of [0 1 0], [1 1 0], [0 0 0], and [0 1 1].

An encoder with respect to X may identify a co-set including the codewords with respect to X, and transmit an index with respect to each co-set to a decoding unit instead of each codeword. In this instance, if two values of X are represented as a single co-set, co-sets may be classified to co-set 1 including [0 0 0] and [1 1 1], co-set 2 including [0 0 1] and [1 1 0], co-set 3 [0 1 0] and [1 0 1], and co-set 4 including [1 0 0] and [0 1 1].

A hamming distance between codewords in a single co-set is selected to be greater than a prediction error between X and Y, that is a hamming distance.

As described above, since four sets of co-sets exist with respect to X, the four sets of co-sets may be indexed to be 2-bit data. That is, an efficiency of coding is increased since the four sets of co-sets are coded to be 2-bit data instead of 3-bit data. The decoder refers to Y being obtained from a temporally adjacent residual image to select a codeword which is closest to Y, thereby obtaining an accurate X from a corresponding co-set.

Also, if the decoder is given Y, an error N being added to X by forward error correction (FEC) is detected, X may be reconstructed. In this instance, the decoder exclusively transmits parity information to the decoder, and the decoder may reconstruct a channel code using Y obtained from the temporally adjacent information and the received parity information. The decoder obtains side information by performing motion estimation and compensation between adjacent Ys to increase correlation with X, which is a target to be reconstructed, and reconstructs X when decoding using the side information. That is, according to the present exemplary embodiment, unlike a conventional method, motion estimation and compensation is performed in a decoder instead of being performed in an encoder, thereby distributing complexity of the encoder with the decoder.

Also, X may be obtained from the reconstruction of N when the parity information is multiplied by the channel code.

Accordingly, the residual coding unit 400 classifies a plurality of quantizing coefficients being obtained through quantization into co-sets which include a plurality of coefficients, and codes the classified co-sets to a single symbol. In this instance, the hamming distance between codewords in the co-sets is selected to be larger than a distance between X and Y.

The classification unit 407 classifies a block based on correlation between the inputted residual image and the syndrome coded bitstream to match the channel code with the block. That is, the residual coding unit 400 configures co-sets based on correlation between temporally adjacent residual images. Specifically, a hamming distance between codewords in co-sets is configured to be large if correlation is lower and a large number of bits are allocated by making a size of quantization relatively small, and a hamming distance between codewords in co-sets is configured to be small if correlation is high and a smaller number of bits are allocated by making a size of quantization relatively greater. For this, the classification unit 407 classifies the block according to an amount of correlation of each block.

Figure 5:
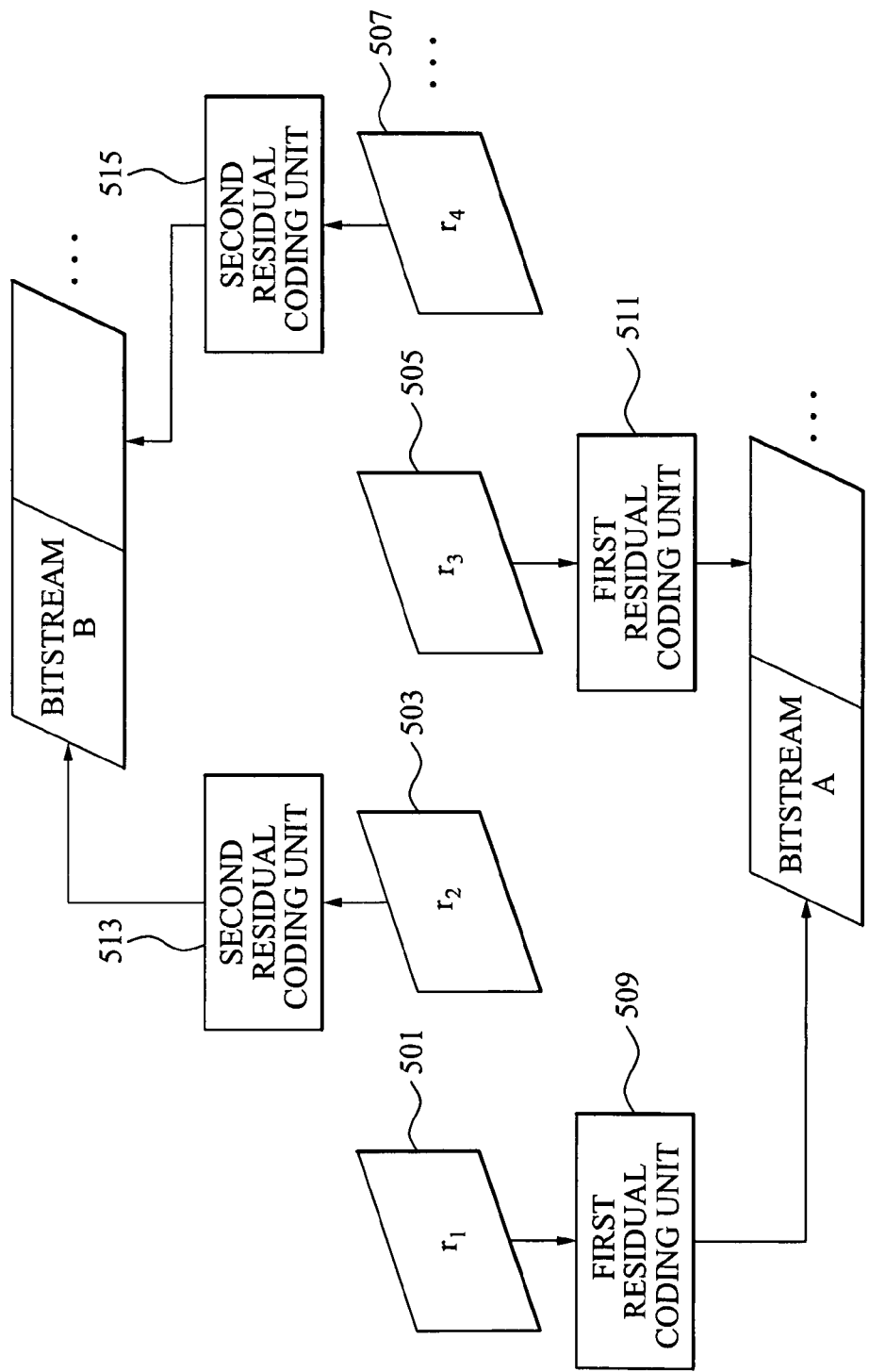
FIG. 5 is a block-diagram illustrating coding operations of a residual image according to an exemplary embodiment of the present invention.

FIG. 5 is a block-diagram illustrating coding operations of a residual image according to an exemplary embodiment of the present invention.

Referring to FIG. 5, residual images 501 and 505 of a key frame are intra mode coded by first residual coding units 509 and 511, which are at least similar to first residual coding unit 307, and configure a bitstream A. Residual images 503 and 507 of an even number$^{th}$ frame, that is a power distribution frame, are power distribution coded by second residual coding units 513 and 515, which are at least similar to second residual coding unit 309, and configure a bitstream B.

Figure 6:
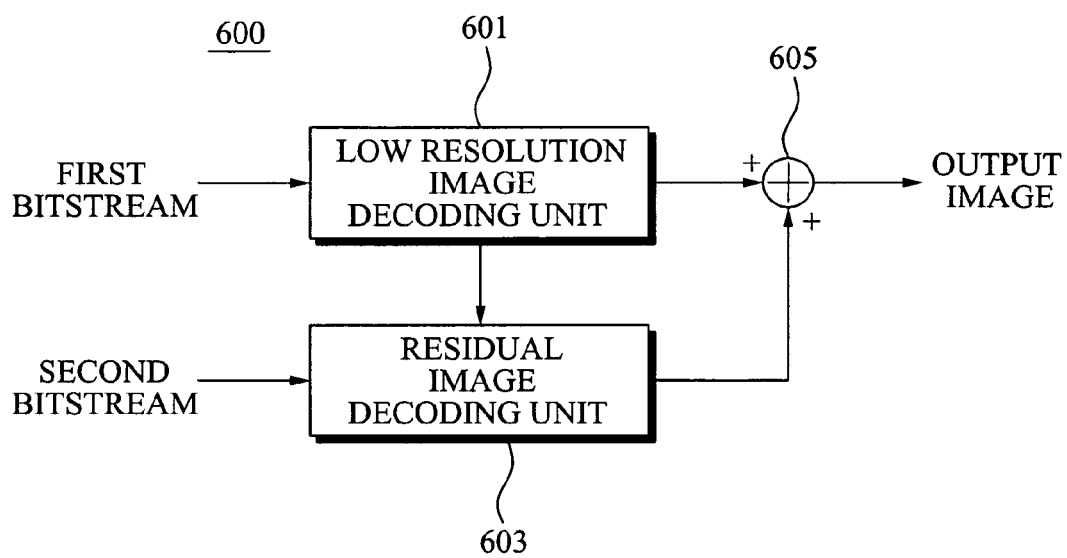
FIG. 6 is a block-diagram illustrating a configuration of an apparatus for decoding an image according to an exemplary embodiment of the present invention.

FIG. 6 is a block-diagram illustrating a configuration of an apparatus 600 to decode an image according to another exemplary embodiment of the present invention.

Referring to FIG. 6, the apparatus 600 includes a low resolution image decoding unit 601, a residual image decoding unit 603, and a combination unit 605.

The low resolution image decoding unit 601 receives a first bitstream, to decode the received first bitstream to a low resolution image, and up-samples the decoded low resolution image to a predetermined resolution.

In this instance, the low resolution image decoding unit 601 up-samples a decoded low resolution image respectively in a horizontal direction and a vertical direction by two times when the low resolution image has a ¼ spatial resolution in comparison to an original image.

The residual image decoding unit 603 receives the reconstructed low resolution image from the low resolution image decoding unit 601 to decode the second bitstream to a residual image.

In this instance, the residual image decoding unit 603 performs intra mode decoding with respect to the second bitstream when the second bitstream is a bitstream with respect to the key frame, and performs power distribution decoding when the second bitstream is a bitstream with respect to a power distribution frame.

The combination unit 605 combines an output image from the low resolution image decoding unit 601 and an output image from the residual image decoding unit 603 to generate an output image being compensated for quality loss.

Figure 7:
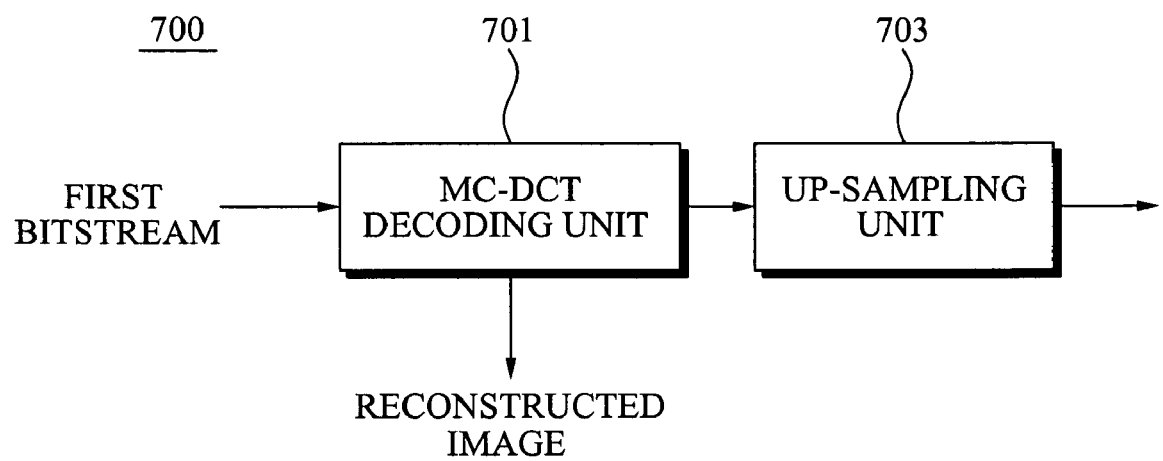
FIG. 7 is a block-diagram illustrating a configuration of a low resolution image decoding unit according to an exemplary embodiment of the present invention.

FIG. 7 is a block-diagram illustrating a configuration of a low resolution image decoding unit 700, which may be used as the low resolution image decoding unit 601, according to an exemplary embodiment of the present invention.

Referring to FIG. 7, the low resolution image decoding unit 700 includes an MC-DCT decoding unit 701 and up-sampling unit 703.

MC-DCT decoding unit 701 performs MC-DCT decoding with respect to a first bitstream. Therefore, MC-DCT decoding unit 701 obtains a temporally similar image through motion compensation, and decodes an input image by reconstructing a residual image indicating a difference between a motion estimation image and a reconstructed image through inverse quantization, inverse DCT, and entropy decoding.

According to the present exemplary embodiment, the MC-DCT decoding unit 701 may provide a residual image decoding unit with the low resolution reconstructed image which is obtained through motion search during the MC-DCT decoding operation.

The up-sampling unit 703 up-samples the reconstructed low resolution image to a predetermined resolution.

Figure 8:
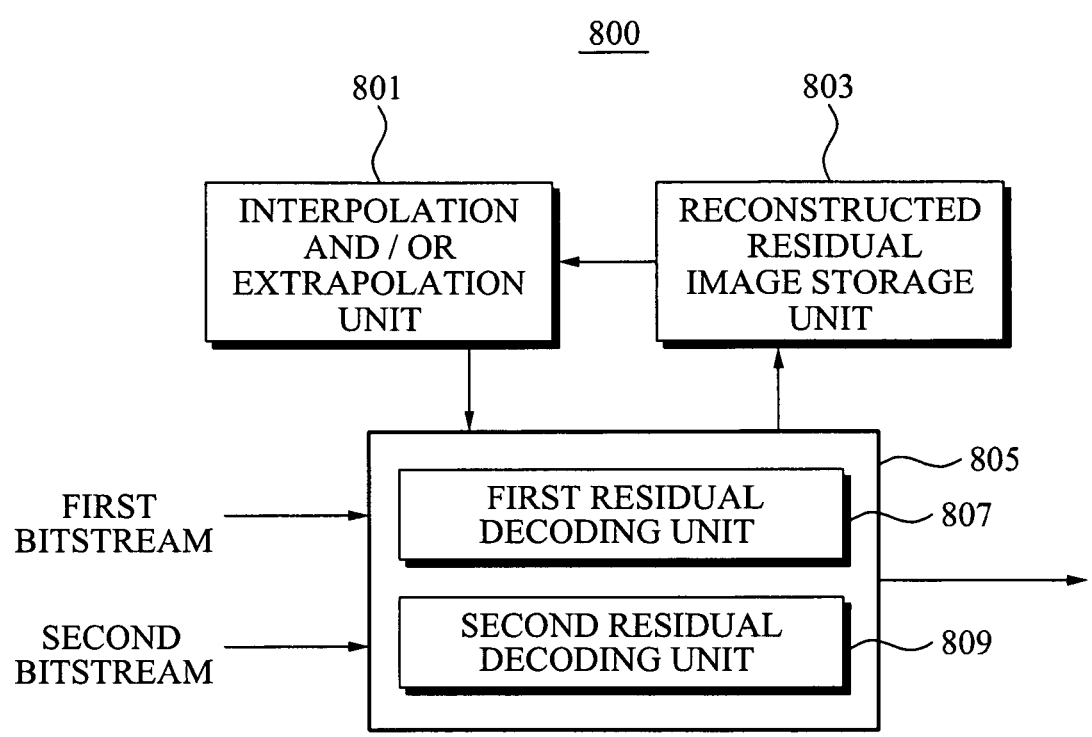
FIG. 8 is a block-diagram illustrating a configuration of a residual image decoding unit according to an exemplary embodiment of the present invention.

FIG. 8 is a block-diagram illustrating a configuration of a residual image decoding unit 800, which may be used as the residual image decoding unit 603, according to an exemplary embodiment of the present invention.

Referring to FIG. 8, the residual image decoding unit 800 includes an interpolation and/or extrapolation unit 801, a reconstructed residual image storage unit 803, and a residual decoding unit 805.

The reconstructed residual image storage unit 803 stores residual images before and after reconstructing, that is key frames $(2n-1)^{th}$ and $(2n+1)^{th}$.

The interpolation and/or extrapolation unit 801 generates an estimated residual image having high correlation with a residual image to be presently reconstructed, that is a $2n^{th}$ power distribution frame, via motion estimation between the residual images before and after reconstructing, e.g. key frames $(2n-1)^{th}$ and $(2n+1)^{th}$.

The interpolation and/or extrapolation unit 801, in order to generate the estimated residual image, performs motion estimation by a block unit between the residual images before and after reconstructing to obtain motion information, and estimates interpolation and/or extrapolation using the motion information.

The residual decoding unit 805 includes a first residual decoding unit 807 performing intra mode decoding and a second residual decoding unit 809 performing power distribution decoding using temporal correlation between images.

According to the present exemplary embodiment, when a second bitstream does not exist, the residual image decoding unit 800 may skip residual image decoding by the residual decoding unit 805.

The first residual decoding unit 807 performs intra mode decoding with respect to the second bitstream when the second bitstream is a bitstream with respect to a key frame.

The second residual decoding unit 809 performs power distribution decoding with respect to the second bitstream when the second bitstream is a bitstream with respect to a power distribution frame.

That is, the second residual decoding unit 809 may decode the second bitstream corresponding to a power distribution frame between a first key frame and a second key frame using temporal correlation between the first key frame and the second key frame.

In this instance, as described above, the second residual decoding unit 809 selects a quantizing coefficient most similar to the estimated residual image, thereby decoding the second bitstream to a residual image.

Accordingly, the second residual decoding unit 809 receives the estimated residual image being obtained through the motion estimation and compensation between the first key frame and the second key frame, and selects a quantizing coefficient having highest correlation with the estimated residual image from among the plurality of quantizing coefficients being coded to be a single symbol, thereby decoding the second bitstream.

Figure 9:
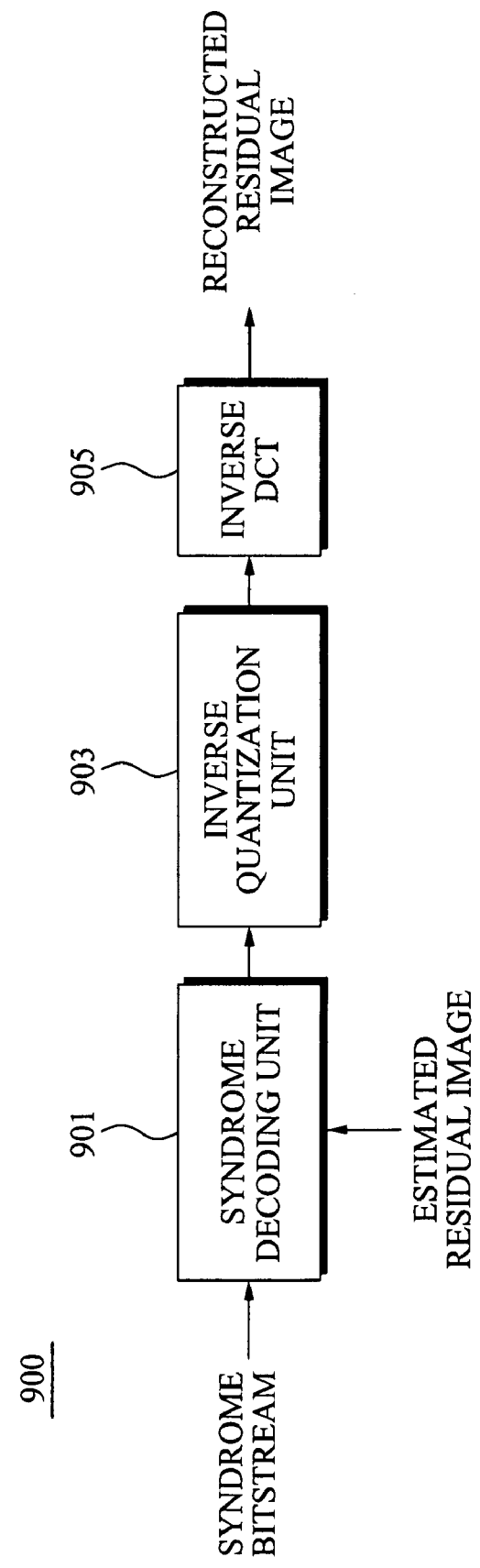
FIG. 9 is a block-diagram illustrating a configuration of a residual decoding unit according to an exemplary embodiment of the present invention.

FIG. 9 is a block-diagram illustrating a configuration of a residual decoding unit 900, which may be used as the residual decoding unit 805, according to an exemplary embodiment of the present invention.

Referring to FIG. 9, the residual decoding unit 900 includes a syndrome decoding unit 901, an inverse quantization unit 903, and an inverse DCT unit 905.

The syndrome decoding unit 901 decodes a syndrome bitstream using an estimated residual image provided from the interpolation and/or extrapolation unit 801 of FIG. 8.

The syndrome decoding unit 901 decodes the syndrome bitstream according to the above described power distribution coding and syndrome coding theory. That is, the decoding unit 901 obtains a symbol of a quantizing coefficient from the syndrome bitstream, and selects a most similar quantizing coefficient to the estimated residual image from among a plurality of quantizing coefficients indicated by the single symbol.

According to the present exemplary embodiment, if an error check, for example cyclic redundancy check (CRC), of the syndrome decoded residual image is successful, it is determined that the decoding is successful. In this instance, when the error check fails, a syndrome decoding operation may be repeated by repeatedly performing motion search with respect to a reconstructed previous residual image, and interpolation and/or extrapolation.

The inverse quantization unit 903 performs inverse quantization with respect to the syndrome decoded quantizing coefficient in correspondence to the quantization in a coding terminal.

As described above, a complexity problem in an encoder may be solved since motion estimation and compensation is performed in a decoding terminal without performing the motion estimation and compensation in the coding terminal. Also, quality loss occurring due to absence of motion estimation and compensation in the coding terminal may be compensated by performing power distribution decoding and syndrome decoding in a decoding terminal.

The inverse DCT 905 performs inverse DCT with respect to the inverse quantized residual image in correspondence to the DCT in the coding terminal to generate the decoded residual image.

Figure 10:
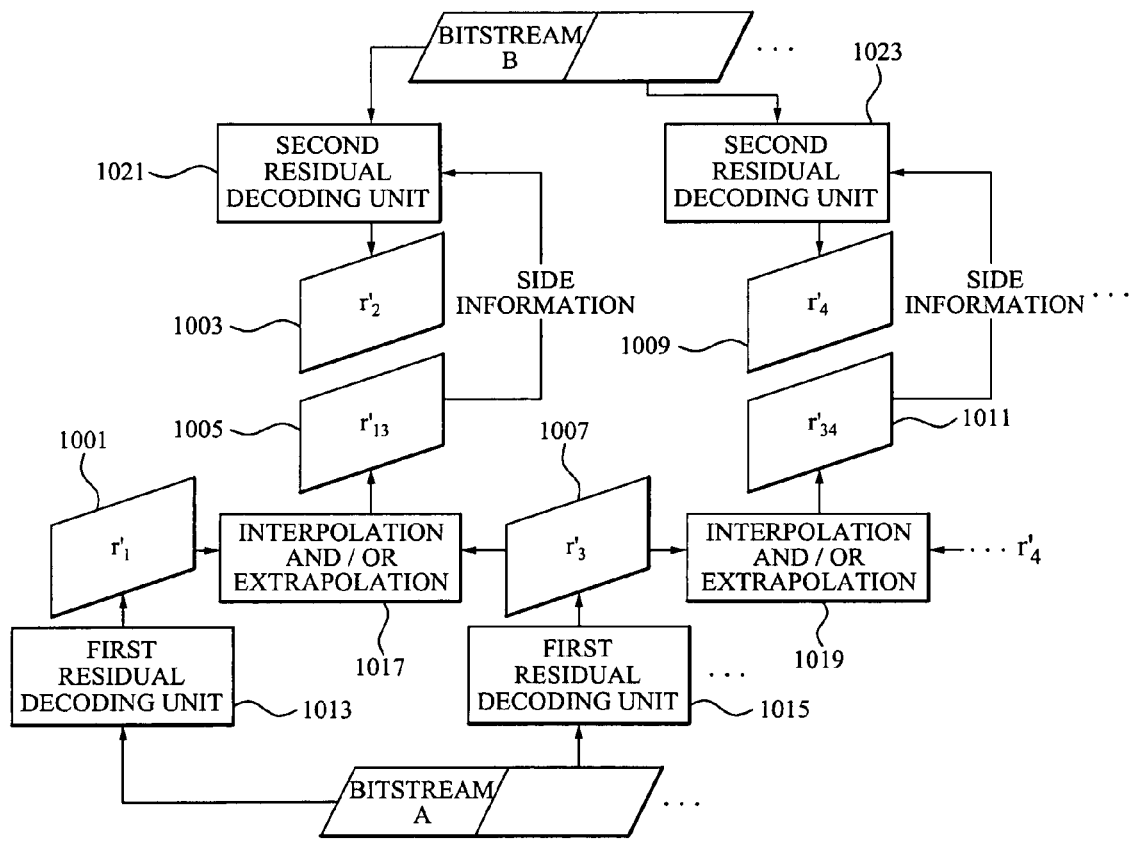
FIG. 10 is a diagram illustrating decoding operations of a residual image of the present invention.

FIG. 10 is a diagram illustrating decoding operations of a residual image.

Referring to FIG. 10, first residual decoding units 1013 and 1015 decode a bitstream A to residual images 1001 and 1007 of key frames.

Interpolation and/or extrapolation units 1017 and 1019 generate estimated residual images 1005 and 1011.

Second residual decoding units 1021 and 1023 extract side information from the estimated residual images 1005 and 1011, decode bitstream B using the side information, thereby generating frame residual images 1003 and 1009 of power distribution frames.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over a transmissionr communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of a communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus to code an image, the apparatus comprising:
a low resolution image coding unit that codes a plurality of low resolution images respectively corresponding to a plurality of input images using motion estimation and compensation; and
a residual image coding unit that performs intra mode coding with respect to a plurality of residual images, the residual images relating to differences between reconstructed images of the coded low resolution images that are up-sampled and the input images, the residual image coding unit performing the intra mode coding by considering a temporal correlation between neighboring ones of the residual images when the residual image being coded is between key frames,
wherein the residual image coding unit comprises:
a first residual coding unit that performs the intra mode coding, the intra mode coded residual image corresponding to a first key frame; and
a second residual coding unit, the residual image coded by the second residual coding unit being a power distribution frame between the first key frame and a second key frame, the second residual coding unit considering a temporal correlation between the first key frame and the second key frame.

2. The apparatus of claim 1, wherein the low resolution image coding unit comprises:
a down-sampling unit that down-samples a resolution of a respective one of the input images to a predetermined resolution to generate a down-sampled input image; and
a motion compensation-discrete cosine transform (MC-DCT) coding unit that codes the down-sampled input image using motion compensation and discrete cosine transform (DCT).

3. The apparatus of claim 1, wherein the second residual coding unit comprises:
a quantization unit that quantizes the residual image of the power distribution frame; and
a syndrome coding unit that codes a plurality of quantizing coefficients into a single symbol, the plurality of quantizing coefficients corresponding to the residual image of the power distribution frame.

4. A method of coding a residual image, the residual image indicating a difference between an input image and a reconstructed image of the input image, the method comprising:
quantizing the residual image to generate a plurality of quantizing coefficients;
classifying the plurality of quantizing coefficients into a co-set including at least two of the quantizing coefficients; and
coding the residual image, the input image including operations which code the co-set to a single symbol,
wherein co-sets are configured based on correlation between temporally adjacent residual images.

5. The method of claim 4, wherein the input image corresponds to the residual image of a power distribution frame between a first key frame and a second key frame.

6. The method of claim 5, wherein, in the co-set, a distance between codewords in the co-set is larger than a distance between frames estimated from the power distribution frame and the first key frame, and is also larger than a distance between frames estimated from the power distribution frame and the second key frame.

7. An apparatus to decode an image, the apparatus comprising:
a low resolution image decoding unit that decodes a first bitstream corresponding to a low resolution image; and
a residual image decoding unit that decodes a second bitstream corresponding to one of a plurality of residual images using a temporal correlation between neighboring ones of the residual images when the residual image being decoded is between key frames,
wherein the residual image decoding unit comprises:
a first residual decoding unit that performs intra mode decoding with respect to the second bitstream corresponding to a first key frame; and
a second residual decoding unit that decodes the second bitstream corresponding to a power distribution frame between the first key frame and a second key frame using temporal correlation between the first key frame and the second key frame.

8. The apparatus of claim 7, further comprising:
a combination unit that combines an image being decoded by the low resolution image decoding unit and an image being decoded by the residual image decoding unit.

9. The apparatus of claim 7, wherein the low resolution image decoding unit comprises:

an MC-DCT decoding unit that decodes the first bitstream in a discrete cosine transform area; and an up-sampling unit that up-samples an image being decoded in the discrete cosine transform area.

10. The apparatus of claim 7, wherein the second residual decoding unit receives an estimated residual image being decoded using the temporal correlation between the first frame key and the second frame key, selects a quantizing coefficient having a highest correlation with the estimated residual image, from among a plurality of quantizing coefficients being coded to be a single symbol, to decode the second bitstream.

11. The apparatus of claim 1, wherein power distribution coding generates side information about a present frame using correlation between a present frame and a neighboring frame, and the present frame is reconstructed based on a fact that the estimated side information has high correlation with an original frame.

12. The apparatus of claim 11, wherein the power distribution coding quantizes the present frame without estimation or compensation with respect to the present frame, and exclusively transmits parity information about the input image to a decoding terminal.

13. The apparatus of claim 1, further comprising an interpolation and/or extrapolation unit to generate an estimated residual image having high correlation with a residual image to be reconstructed, by performing motion estimation.

14. The apparatus of claim 7, further comprising an interpolation and/or extrapolation unit to generate an estimated residual image having high correlation with a residual image to be reconstructed, by performing motion estimation.

15. The apparatus of claim 11, wherein the power distribution coding is Wyner-Ziv coding.

* * * * *